(12) United States Patent
Owoeye et al.

(10) Patent No.: US 12,071,896 B2
(45) Date of Patent: Aug. 27, 2024

(54) AIR-TO-AIR HEAT EXCHANGER POTENTIAL IN GAS TURBINE ENGINES

(71) Applicant: General Electric Company, Schenectady, NY (US)

(72) Inventors: Eyitayo James Owoeye, Houston, TX (US); Scott Alan Schimmels, Miamisburg, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 18/500,546

(22) Filed: Nov. 2, 2023

(65) Prior Publication Data

US 2024/0077027 A1    Mar. 7, 2024

Related U.S. Application Data

(63) Continuation-in-part of application No. 17/706,814, filed on Mar. 29, 2022, now Pat. No. 11,834,995.

(51) Int. Cl.
*F02C 7/18* (2006.01)

(52) U.S. Cl.
CPC .......... *F02C 7/18* (2013.01); *F05D 2260/213* (2013.01)

(58) Field of Classification Search
CPC ............................. F02C 7/18; F05D 2260/213
See application file for complete search history.

(56) References Cited

U.S. PATENT DOCUMENTS

| | | |
|---|---|---|
| 2,999,630 A | 9/1961 | Warren et al. |
| 3,341,114 A | 9/1967 | Larson |
| 3,981,466 A | 9/1976 | Shah |
| 4,010,608 A | 3/1977 | Simmons |
| 4,043,121 A | 8/1977 | Thomas et al. |
| 4,446,696 A | 5/1984 | Sargisson et al. |
| 4,486,146 A | 12/1984 | Campion |
| 4,542,623 A | 9/1985 | Hovan et al. |

(Continued)

FOREIGN PATENT DOCUMENTS

| | | |
|---|---|---|
| CN | 1204005 A | 1/1999 |
| EP | 3054126 A1 | 8/2016 |

(Continued)

OTHER PUBLICATIONS

Co-Pending U.S. Appl. No. 17/366,414, filed Jul. 2, 2021.

(Continued)

*Primary Examiner* — Michael L Sehn
(74) *Attorney, Agent, or Firm* — Dority & Manning, P.A.

(57) ABSTRACT

A gas turbine engine is provided. The gas turbine engine includes a compressor section, a combustion section, and a turbine section in a serial flow arrangement; and an air-to-air heat exchanger having an air-to-air heat exchanger potential defined by a product raised to a half power, the product being an effectiveness associated with the air-to-air heat exchanger multiplied by an airflow conductance factor associated with the gas turbine engine, and wherein the air-to-air heat exchanger potential is between 0.028 and 0.067 for a bypass ratio associated with the gas turbine engine between 3 and 10 and the effectiveness being between 0.5 and 0.9 and is between 0.015 and 0.038 for a bypass ratio associated with the gas turbine engine between 10 and 20 and the effectiveness being between 0.3 and 0.9.

20 Claims, 10 Drawing Sheets

(56) References Cited

U.S. PATENT DOCUMENTS

| | | |
|---|---|---|
| 4,569,199 A | 2/1986 | Klees et al. |
| 4,607,657 A | 8/1986 | Hirschkron |
| 4,784,575 A | 11/1988 | Nelson et al. |
| 4,796,424 A | 1/1989 | Farrar et al. |
| 4,860,537 A | 8/1989 | Taylor |
| 4,892,269 A | 1/1990 | Greco et al. |
| 4,907,946 A | 3/1990 | Ciokajlo et al. |
| 4,916,894 A | 4/1990 | Adamson et al. |
| 4,941,803 A | 7/1990 | Wainauski et al. |
| 4,976,102 A | 12/1990 | Taylor |
| 5,054,998 A | 10/1991 | Davenport |
| 5,190,441 A | 3/1993 | Murphy et al. |
| 5,197,855 A | 3/1993 | Magliozzi et al. |
| 5,259,187 A | 11/1993 | Dunbar et al. |
| 5,345,760 A | 9/1994 | Giffin, III |
| 5,457,346 A | 10/1995 | Blumberg et al. |
| 5,465,702 A | 11/1995 | Ferrenberg |
| 5,950,308 A | 9/1999 | Koff et al. |
| 6,082,670 A | 7/2000 | Chapman |
| 6,339,927 B1 | 1/2002 | DiPietro, Jr. |
| 6,547,518 B1 | 4/2003 | Czachor et al. |
| 6,763,654 B2 | 7/2004 | Orlando et al. |
| 6,792,758 B2 | 9/2004 | Dowman |
| 6,905,303 B2 | 6/2005 | Liu et al. |
| 7,536,865 B2 | 5/2009 | Mikhail |
| 7,559,191 B2 | 7/2009 | Parks |
| 7,726,935 B2 | 6/2010 | Johnson |
| 7,762,766 B2 | 7/2010 | Shteyman et al. |
| 8,069,912 B2 | 12/2011 | Campagna et al. |
| 8,167,239 B2 | 5/2012 | Guering et al. |
| 8,251,308 B2 | 8/2012 | Choi |
| 8,276,392 B2 | 10/2012 | van der Woude |
| 8,382,430 B2 | 2/2013 | Parry et al. |
| 8,397,487 B2 | 3/2013 | Sennoun et al. |
| 8,459,035 B2 | 6/2013 | Smith et al. |
| 8,689,538 B2 | 4/2014 | Sankrithi et al. |
| 8,762,766 B2 | 6/2014 | Ferguson et al. |
| 8,786,266 B2 | 7/2014 | Deval et al. |
| 8,876,465 B2 | 11/2014 | Stretton |
| 8,943,796 B2 | 2/2015 | McCaffrey |
| 8,967,967 B2 | 3/2015 | Stretton et al. |
| 9,027,353 B2 | 5/2015 | Glahn et al. |
| 9,038,398 B2 | 5/2015 | Suciu et al. |
| 9,045,996 B2 | 6/2015 | Anghel et al. |
| 9,096,312 B2 | 8/2015 | Moxon |
| 9,097,134 B2 | 8/2015 | Ferch et al. |
| 9,239,005 B2 | 1/2016 | Strecker et al. |
| 9,242,721 B2 | 1/2016 | Neuteboom |
| 9,534,538 B1 | 1/2017 | Cerny |
| 9,683,547 B2 | 6/2017 | Kim et al. |
| 9,982,555 B2 | 5/2018 | Thet et al. |
| 9,995,314 B2 | 6/2018 | Miller et al. |
| 10,012,146 B2 | 7/2018 | Pelagatti et al. |
| 10,077,660 B2 | 9/2018 | Hoefer et al. |
| 10,090,676 B2 | 10/2018 | Knowles et al. |
| 10,126,062 B2 | 11/2018 | Cerny et al. |
| 10,184,400 B2 | 1/2019 | Cerny et al. |
| 10,202,865 B2 | 2/2019 | Breeze-Stringfellow et al. |
| 10,209,009 B2 | 2/2019 | Gerstler et al. |
| 10,253,648 B2 | 4/2019 | Bentley et al. |
| 10,260,419 B2 | 4/2019 | Cerny et al. |
| 10,263,550 B2 | 4/2019 | Thet et al. |
| 10,344,674 B2 | 7/2019 | Cerny et al. |
| 10,364,750 B2 | 7/2019 | Rambo |
| 10,415,468 B2 | 9/2019 | Ackermann et al. |
| 10,443,436 B2 | 10/2019 | Miller et al. |
| 10,443,508 B2 * | 10/2019 | Merry ............... F02C 7/36 |
| 10,487,739 B2 | 11/2019 | Miller et al. |
| 10,578,028 B2 | 3/2020 | Becker, Jr. |
| 10,634,233 B1 | 4/2020 | Smith |
| 10,644,630 B2 | 5/2020 | Smith et al. |
| 2004/0197187 A1 | 10/2004 | Usab et al. |
| 2004/0234372 A1 | 11/2004 | Shahpar |
| 2009/0078819 A1 | 3/2009 | Guering et al. |
| 2010/0014977 A1 | 1/2010 | Shattuck |
| 2010/0111674 A1 | 5/2010 | Sparks |
| 2010/0244446 A1 | 9/2010 | Qu et al. |
| 2010/0251726 A1 | 10/2010 | Jones et al. |
| 2010/0329856 A1 | 12/2010 | Hofer et al. |
| 2011/0150659 A1 | 6/2011 | Micheli et al. |
| 2011/0192166 A1 | 8/2011 | Mulcaire |
| 2012/0177493 A1 | 7/2012 | Fabre |
| 2012/0315141 A1 | 12/2012 | Udall |
| 2013/0104522 A1 | 5/2013 | Kupratis |
| 2014/0020404 A1 | 1/2014 | Sheridan et al. |
| 2014/0133982 A1 | 5/2014 | Dejeu et al. |
| 2014/0345253 A1 | 11/2014 | Dawson et al. |
| 2014/0345254 A1 | 11/2014 | Dawson et al. |
| 2014/0363276 A1 | 12/2014 | Vetters et al. |
| 2015/0003993 A1 | 1/2015 | Kim et al. |
| 2015/0098813 A1 | 4/2015 | Jarrett, Jr |
| 2015/0284070 A1 | 10/2015 | Breeze-Stringfellow et al. |
| 2015/0291276 A1 | 10/2015 | Zatorski et al. |
| 2016/0010487 A1 | 1/2016 | Breeze-Stringfellow et al. |
| 2016/0160647 A1 | 6/2016 | Hofer et al. |
| 2016/0202003 A1 | 7/2016 | Gerstler et al. |
| 2016/0230658 A1 | 8/2016 | Hanlon et al. |
| 2016/0333729 A1 | 11/2016 | Miller et al. |
| 2017/0051678 A1 | 2/2017 | Becker, Jr. |
| 2017/0051680 A1 | 2/2017 | Becker, Jr. et al. |
| 2017/0102006 A1 | 4/2017 | Miller et al. |
| 2017/0114721 A1 | 4/2017 | Miller et al. |
| 2017/0138265 A1 | 5/2017 | Simon-Delgado et al. |
| 2017/0167382 A1 | 6/2017 | Miller et al. |
| 2017/0184027 A1 | 6/2017 | Moniz et al. |
| 2017/0198719 A1 | 7/2017 | Cerny et al. |
| 2017/0283073 A1 | 10/2017 | Suciu et al. |
| 2018/0065727 A1 | 3/2018 | Gruber et al. |
| 2018/0100702 A1 | 4/2018 | Veilleux, Jr. et al. |
| 2018/0118364 A1 | 5/2018 | Golshany et al. |
| 2018/0215475 A1 | 8/2018 | Hurt et al. |
| 2018/0283795 A1 | 10/2018 | Cerny et al. |
| 2019/0024527 A1 | 1/2019 | Skertic et al. |
| 2019/0136710 A1 | 5/2019 | Breeze-Stringfellow et al. |
| 2019/0153952 A1 | 5/2019 | Niergarth et al. |
| 2019/0153953 A1 | 5/2019 | Niergarth et al. |
| 2019/0218971 A1 | 7/2019 | Niergarth et al. |
| 2019/0249599 A1 | 8/2019 | Sen et al. |
| 2019/0257247 A1 | 8/2019 | Pal et al. |
| 2019/0323433 A1 | 10/2019 | Bewick et al. |
| 2019/0360400 A1 | 11/2019 | Elliott et al. |
| 2019/0360401 A1 | 11/2019 | Rambo et al. |
| 2020/0095939 A1 | 3/2020 | Epstein |
| 2020/0217249 A1 | 7/2020 | Djelassi |
| 2021/0017914 A1 | 1/2021 | Turner |
| 2021/0108573 A1 | 4/2021 | Sibbach et al. |
| 2021/0403169 A1 | 12/2021 | Tantot et al. |

FOREIGN PATENT DOCUMENTS

| | | |
|---|---|---|
| JP | H0370698 A | 3/1991 |
| JP | 2006123880 A | 5/2006 |
| WO | WO2011/020458 A2 | 2/2011 |

OTHER PUBLICATIONS

Co-Pending U.S. Appl. No. 17/730,610, filed Apr. 27, 2022.

Crigler, Application of Theodorsen's Theory to Propeller Design, NACA (National Advisory Committee for Aeronautics) Report 924, 1948, pp. 83-99.

Naveen et al., CFD Analysis of Low Pressure Turbine Blade Using Vortex Generator Jets, Proceedings of 7th International Conference on Intelligent Systems and Control (ISCO 2013) IEEE Explore, Coimbatore, Tamil Nadu, India, Jan. 4-5, 2013, pp. 541-544. https://ieeexplore.ieee.org/document/6481213.

Smith Jr, Unducted Fan Aerodynamic Design, Journal of Turbomachinery, vol. 109, Jul. 1987, pp. 313-324.

Theodorsen, Theory of Propellers, Wartime Report, NACA (National Advisory Committee for Aeronautics), Aug. 1944, pp. 1-53.

Yamamoto et al., Numerical Calculation of Propfan/Swirl Recovery Vane Flow Field, AIAA-92-3771, AIAA//SAE/ASME/ASEE 28th

(56) References Cited

OTHER PUBLICATIONS

Joint Propulsion Conference and Exhibit, Jul. 6-8, 1992, Nashville TN, pp. 1-9.

* cited by examiner (1) $\quad AHEP = (\varepsilon_{HX} * ACF)^{1/2}$ (2) $\quad \varepsilon_{HX} = \dfrac{m_c cp_c \beta}{min(m_h cp_h, m_c cp_c)\theta}$ (3) $\quad ACF = D_{FAN} / (L * BPR * OPR)$

FIG. 6

| ENGINE PARAMETERS | EXAMPLE 1 | EXAMPLE 2 | EXAMPLE 3 |
|---|---|---|---|
| HEAT EXCHANGER EFFECTIVENESS (-) | 0.3 | 0.7 | 0.9 |
| FAN DIAMETER (M) | 0.5 | 3 | 5 |
| BYPASS RATIO (-) | 3 | 10 | 20 |
| OVERALL PRESSURE RATIO (-) | 10 | 50 | 80 |
| ENGINE LENGTH (M) | 1.2 | 4 | 10 |
| AIR-TO-AIR HEAT EXCHANGER POTENTIAL (-) | 0.065 | 0.032 | 0.017 |

OPERATING A GAS TURBINE ENGINE HAVING A FAN AND AN ENGINE CORE POSITIONED DOWNSTREAM OF THE FAN, THE ENGINE CORE HAVING A COMPRESSOR SECTION THAT INCLUDES ONE OR MORE COMPRESSORS, THE ENGINE CORE DEFINING A CORE AIR FLOWPATH, THE GAS TURBINE ENGINE HAVING AN AIR-TO-AIR HEAT EXCHANGER IN FLOW COMMUNICATION WITH THE CORE AIR FLOWPATH AND HAVING AN AIR-TO-AIR HEAT EXCHANGER POTENTIAL DEFINED BY A PRODUCT RAISED TO A HALF POWER, THE PRODUCT BEING A EFFECTIVENESS ASSOCIATED WITH THE AIR-TO-AIR HEAT EXCHANGER MULTIPLIED BY AN AIRFLOW CONDUCTANCE FACTOR THAT RELATES A FAN DIAMETER OF THE FAN, A BYPASS RATIO OF THE GAS TURBINE ENGINE, AND A NUMBER OF COMPRESSOR STAGES OF THE GAS TURBINE ENGINE, AND WHEREIN THE GAS TURBINE ENGINE IS OPERATED SO THAT THE AIR-TO-AIR HEAT EXCHANGER POTENTIAL IS BETWEEN 0.028 AND 0.067 FOR A BYPASS RATIO ASSOCIATED WITH THE GAS TURBINE ENGINE BETWEEN 3 AND 10 AND THE EFFECTIVENESS BEING BETWEEN 0.5 AND 0.9 AND IS BETWEEN 0.015 AND 0.038 FOR A BYPASS RATIO ASSOCIATED WITH THE GAS TURBINE ENGINE BETWEEN 10 AND 20 AND THE EFFECTIVENESS BEING BETWEEN 0.3 AND 0.9.

FIG. 14 the present disclosure have been used to refer to like or similar parts of the disclosure.

AIR-TO-AIR HEAT EXCHANGER POTENTIAL IN GAS TURBINE ENGINES

CROSS-REFERENCE TO RELATED APPLICATIONS

This application is a continuation-in-part application of U.S. application Ser. No. 17/706,814 filed Mar. 29, 2022, which is hereby incorporated by reference in its entirety.

FIELD

The present disclosure relates to air-to-air heat exchangers for gas turbine engines.

BACKGROUND

A gas turbine engine can include one or more heat exchangers, such as one or more air-to-air heat exchangers. Such air-to-air heat exchangers can be configured to cool relatively warm high pressure air using relatively cool low pressure air. The cooled high pressure air can be used to cool certain components, such as bearings and turbine components. A gas turbine engine having an air-to-air heat exchanger that is arranged to be compact and capable of receiving air flow to be effective in processing heat duty would be a useful addition to the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 6 lists various relationships between heat exchanger characteristics and operational and architectural characteristics of a gas turbine engine in accordance with example embodiments of the present disclosure.

FIG. 13 provides a table listing values for four different example gas turbine engines in accordance with example embodiments of the present disclosure; and FIG. 14 provides a flow diagram for a method of operating a gas turbine engine having a heat exchanger in flow communication thereto in accordance with an example embodiment of the present disclosure.

DETAILED DESCRIPTION

Figure 1:
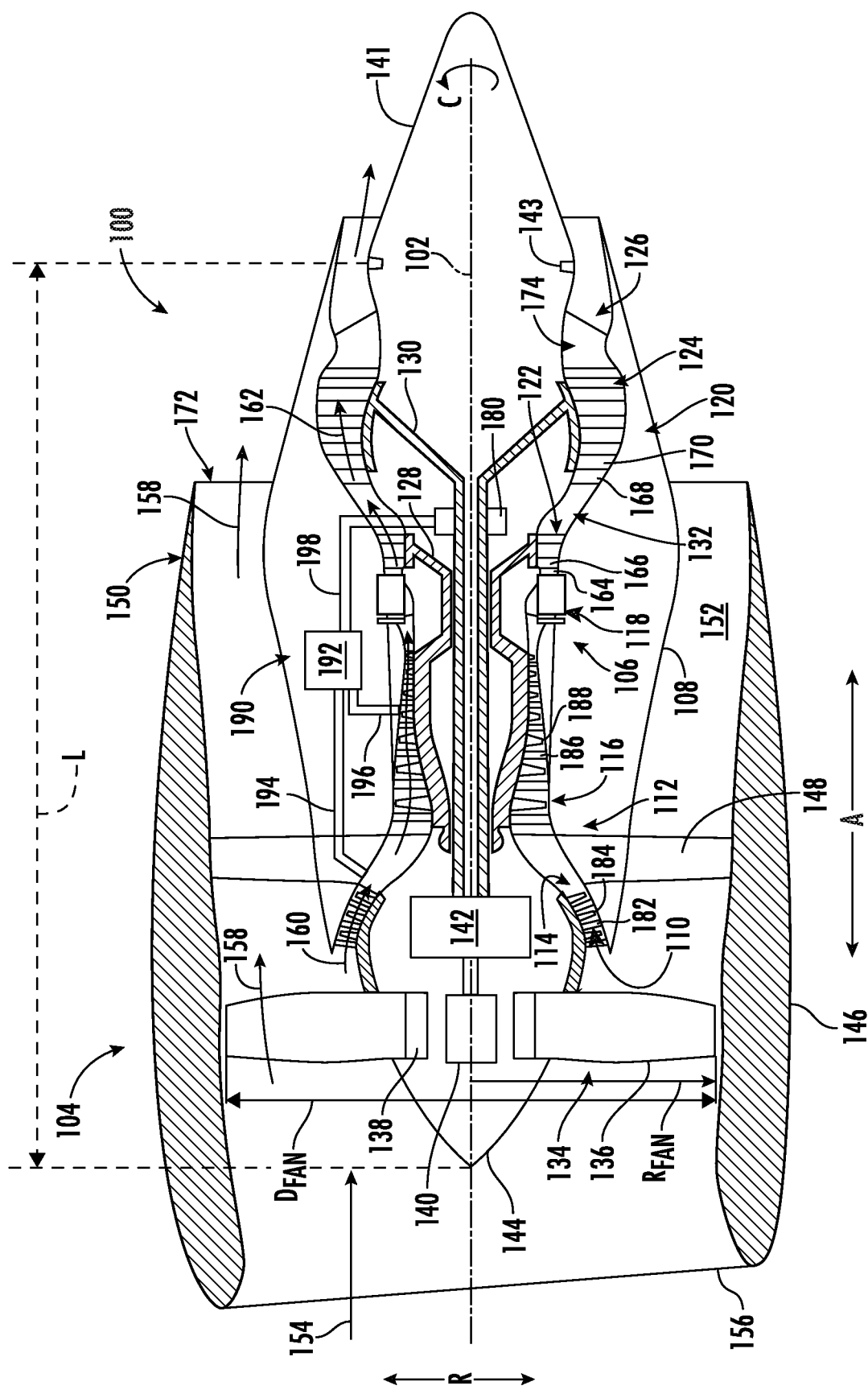
FIG. 1 provides a schematic cross-sectional view of a gas turbine engine in accordance with an example embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers only A, only B, only C, or any combination of A, B, and C.

Here and throughout the specification and claims, range limitations are combined and interchanged, such ranges are identified and include all the sub-ranges contained therein unless context or language indicates otherwise. For example, all ranges disclosed herein (including those using the term "between", e.g., "between A and B") are inclusive of the endpoints, and the endpoints are independently combinable with each other.

Some gas turbine engines can include one or more heat exchangers. For instance, a gas turbine engine can include an air-to-air heat exchanger configured to cool relatively warm high pressure air using relatively cool low pressure air. The cooled high pressure air can be used to cool certain components, such as bearings or turbine components of the gas turbine engine. Designing a gas turbine engine having an air-to-air heat exchanger that is both compact and able to effectively process heat duty has been challenging.

The inventors of the present disclosure have developed architectures for a gas turbine engine having an air-to-air heat exchanger that is both compact and able to effectively process heat duty. Particularly, the inventors proceeded in the manner of designing a turbofan engine with given fan, length, overall pressure ratio, and bypass ratio characteristics, as well as characteristics of an air-to-air heat exchanger in flow communication with a core of the engine; checking the compactness and efficiency of the air-to-air heat exchanger given the characteristics of the fan, length, overall pressure ratio, and bypass ratio as well as characteristics of the heat exchanger; redesigning the engine and/or heat exchanger by varying the fan diameter, length, overall pressure ratio, and bypass ratio characteristics as well as the operating parameters of the heat exchanger; rechecking the compactness and efficiency of the air-to-air heat exchanger given the characteristics of the fan, length, overall pressure ratio, and bypass ratio as well as characteristics of the heat exchanger; etc. during the design of several different types of gas turbine engines, including the gas turbine engine described below with reference to FIG. 1.

During the course of this practice of studying/evaluating various fan, length, overall pressure ratio, bypass ratio, and heat exchanger characteristics considered feasible for best satisfying mission requirements, a relationship was unexpectedly discovered between the effectiveness of the heat exchanger and the ease of airflow supply to the heat exchanger. This relationship is represented by an air-to-air heat exchanger potential. The air-to-air heat exchanger potential can be thought of as an indicator of the effectiveness of a heat exchanger to process heat duty given the architectural arrangement of the gas turbine engine and the architectural/operational arrangement of the air-to-air heat exchanger. The inventors have found that a gas turbine engine having an air-to-air heat exchanger that has an air-to-air heat exchanger potential within a range specified herein renders a heat exchanger that is both compact and effective at processing heat duty.

Referring now to the drawings, FIG. 1 provides a schematic cross-sectional view of a gas turbine engine 100 according to an example embodiment of the present disclosure. For the depicted embodiment of FIG. 1, the gas turbine engine 100 is an aeronautical, high-bypass turbofan jet engine configured to be mounted to an aircraft, e.g., in an under-wing configuration. As shown, the gas turbine engine 100 defines an axial direction A, a radial direction R, and a circumferential direction C. The axial direction A extends parallel to or coaxial with a longitudinal centerline 102 defined by the gas turbine engine 100.

The gas turbine engine 100 includes a fan section 104 and an engine core 106 disposed downstream of the fan section 104. The engine core 106 includes an engine cowl 108 that defines an annular core inlet 110. The engine cowl 108 encases, in a serial flow relationship, a compressor section 112 including a first, booster or LP compressor 114 and a second, HP compressor 116; a combustion section 118; a turbine section 120 including a first, HP turbine 122 and a second, LP turbine 124; and an exhaust section 126. An HP shaft 128 drivingly connects the HP turbine 122 to the HP compressor 116. An LP shaft 130 drivingly connects the LP turbine 124 to the LP compressor 114. The compressor section 112, combustion section 118, turbine section 120, and exhaust section 126 together define a core air flowpath 132 through the engine core 106.

The fan section 104 includes a fan 134 having a plurality of fan blades 136 coupled to a disk 138 in a circumferentially-spaced apart manner. As depicted, the fan blades 136 extend outward from the disk 138 generally along the radial direction R. For this embodiment, each fan blade 136 is rotatable relative to the disk 138 about a pitch axis P by virtue of the fan blades 136 being mechanically coupled to a suitable actuation member 140 configured to collectively vary the pitch of the fan blades 136, e.g., in unison. The fan blades 136, disk 138, and actuation member 140 are together rotatable about the longitudinal centerline 102 by the LP shaft 130 across a power gearbox 142. The power gearbox 142 includes a plurality of gears for stepping down the rotational speed of the LP shaft 130 to provide a more efficient rotational fan speed. In other embodiments, the fan blades 136, disk 138, and actuation member 140 can be directly connected to the LP shaft 130, e.g., in a direct-drive configuration. Further, in other embodiments, the fan blades 136 of the fan 134 can be fixed-pitch fan blades.

Referring still to FIG. 1, the disk 138 is covered by a rotatable spinner 144 aerodynamically contoured to promote an airflow through the plurality of fan blades 136. Additionally, the fan section 104 includes an annular fan casing or outer nacelle 146 that circumferentially surrounds the fan 134 and/or at least a portion of the engine core 106. The nacelle 146 is supported relative to the engine core 106 by a plurality of circumferentially-spaced outlet guide vanes 148. A downstream section 150 of the nacelle 146 extends over an outer portion of the engine core 106 so as to define a bypass airflow passage 152 therebetween.

During operation of the gas turbine engine 100, a volume of air 154 enters the gas turbine engine 100 through an associated inlet 156 of the nacelle 146 and/or fan section 104. As the volume of air 154 passes across the fan blades 136, a first portion of air 158 is directed or routed into the bypass airflow passage 152 and a second portion of air 160 is directed or routed into the core inlet 110. The pressure of the second portion of air 160 is progressively increased as it flows downstream through the LP compressor 114 and HP compressor 116. Particularly, the LP compressor 114 includes sequential stages of LP compressor stator vanes 182 and LP compressor blades 184 that progressively compress the second portion of air 160. The LP compressor blades 184 are mechanically coupled to the LP shaft 130. Similarly, the HP compressor 116 includes sequential stages of HP compressor stator vanes 186 and HP compressor blades 188 that progressively compress the second portion of air 160 even further. The HP compressor blades 188 are mechanically coupled to the HP shaft 128. The compressed second portion of air 160 is then discharged from the compressor section 112 into the combustion section 118.

The compressed second portion of air 160 discharged from the compressor section 112 mixes with fuel and is burned within a combustor of the combustion section 118 to provide combustion gases 162. The combustion gases 162 are routed from the combustion section 118 along a hot gas path 174 of the core air flowpath 132 through the HP turbine 122 where a portion of thermal and/or kinetic energy from the combustion gases 162 is extracted via sequential stages of HP turbine stator vanes 164 and HP turbine blades 166. The HP turbine blades 166 are mechanically coupled to the HP shaft 128. Thus, when the HP turbine blades 166 extract energy from the combustion gases 162, the HP shaft 128 rotates, thereby supporting operation of the HP compressor 116. The combustion gases 162 are routed through the LP turbine 124 where a second portion of thermal and kinetic energy is extracted from the combustion gases 162 via sequential stages of LP turbine stator vanes 168 and LP turbine blades 170. The LP turbine blades 170 are coupled to the LP shaft 130. Thus, when the LP turbine blades 170 extract energy from the combustion gases 162, the LP shaft 130 rotates, thereby supporting operation of the LP compressor 114 and the fan 134.

The combustion gases 162 are subsequently routed through the exhaust section 126 of the engine core 106 to provide propulsive thrust. Simultaneously, the pressure of the first portion of air 158 is substantially increased as the first portion of air 158 is routed through the bypass airflow passage 152 before it is exhausted from a fan nozzle exhaust section 172 of the gas turbine engine 100, also providing propulsive thrust. The HP turbine 122, the LP turbine 124, and the exhaust section 126 at least partially define the hot gas path 174 for routing the combustion gases 162 through the engine core 106.

Referring still to FIG. 1, it will be appreciated that the turbofan engine 10 defines an engine length L. The engine length L, as used herein, refers to a length along the axial direction A between a forward-most tip of the rotatable spinner 144 and an aft flange 143 of the gas turbine engine 100. The aft flange 143 refers to a circumferential flange proximate an aft end of the gas turbine engine 100 used to couple a tail cone 141 to a remainder of the gas turbine engine 100.

Moreover, it will be appreciated that the gas turbine engine 100 defines an overall pressure ratio OPR. As used herein, the term overall pressure ratio OPR refers to a ratio of a pressure of an airflow at an exit of the compressor section (e.g., at a location immediately downstream of a downstream-most stage of compressor rotor blades of the HP compressor 116) to a pressure of an airflow provided to the turbomachine (e.g., at the inlet 110 in the embodiment of FIG. 1), each during operating of the turbofan engine at a rated power during standard day operating conditions. The overall pressure ratio OPR is measured while operating the gas turbine engine 100 to have a high pressure spool of the turbofan engine operating at one hundred percent capacity (100%).

Notably, as used herein, operating the high pressure spool at 100% capacity, or at a maximum rotational speed, refers to an operating condition of a gas turbine engine wherein the high pressure spool of the gas turbine engine is operated at rotational speed corresponding to its 100% spool speed capacity. The 100% spool speed capacity is a spool operating condition that may occur during a takeoff operating condition, a maximum power cruise operating condition, or other high power operating condition. In some configurations, the 100% spool speed operating condition may be less than a redline operating speed for the spool.

As further shown in FIG. 1, the gas turbine engine 100 includes a cooling system 190 for cooling various components, such as a bearing 180. The cooling system 190 includes one or more heat exchangers, such as heat exchanger 192. The heat exchanger 192 can be a Buffer Air Heat Exchanger (BAHE), for example. For this embodiment, the heat exchanger 192 is configured to receive low pressure compressor discharge bleed air to cool air bled from the HP compressor 116 before the cooled HP compressor air is delivered to cool the bearing 180 and optionally other components as well. The low pressure compressor discharge bleed air can be bled from the core air flowpath 132 and routed to the heat exchanger 192 via a first delivery conduit 194. Bleed air from the HP compressor 116 can be routed to the heat exchanger 192 via a second delivery conduit 196. After being cooled by the Station 2.5 bleed air at the heat exchanger 192, the cooled bleed air from the HP compressor 116 can be routed to the bearing 180 via a third delivery conduit 198. Although not shown, the Station 2.5 bleed air can be routed from the heat exchanger 192 to any suitable location, such as to a core compartment, back to the core air flowpath 132, to another heat exchanger, to an undercowl compartment (for FADEC system thermal management), to the turbine section (e.g., the HP turbine 122 for turbine cooling), the compressor section (e.g., the HP compressor 116 for compressor cooling), or to another suitable location.

It will be appreciated that the gas turbine engine 100 depicted in FIG. 1 is provided by way of example only, and that in other example embodiments, the gas turbine engine 100 may have any other suitable configuration. Additionally, or alternatively, aspects of the present disclosure may be utilized with other suitable aeronautical gas turbine engine, such as a turboshaft engine, turboprop engine, turbojet engine, etc.

Figure 2:
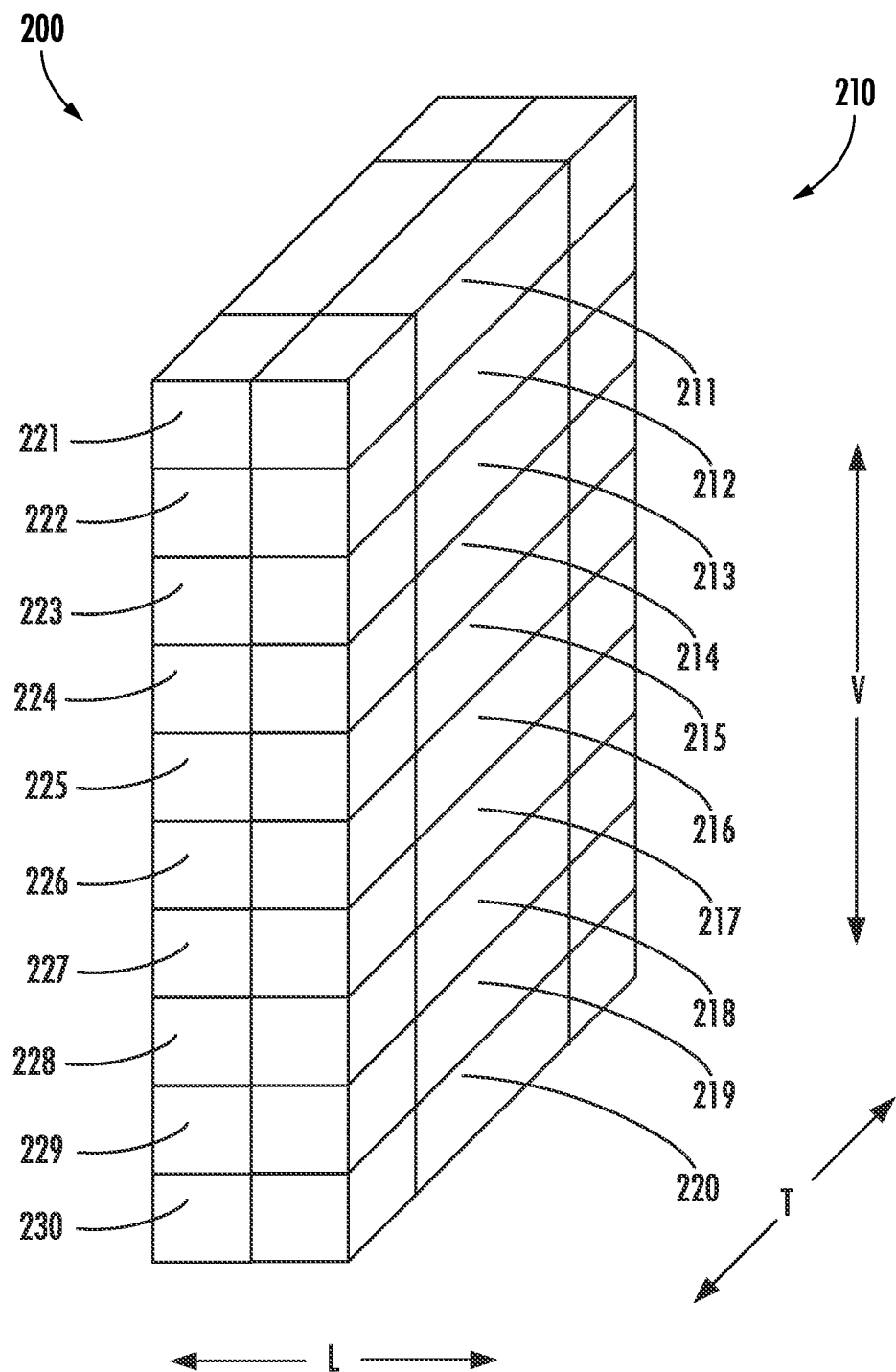
FIG. 2 provides a perspective view of a heat exchanger in accordance with an example embodiment of the present disclosure.

FIG. 2 provides a perspective view of a heat exchanger 200 in accordance with an example embodiment of the present disclosure. The heat exchanger 200 can be implemented as the BAHE provided in FIG. 1, for example. As depicted, the heat exchanger 200 defines a vertical direction V, a lateral direction L, and a transverse direction T that are orthogonal to one another. The heat exchanger 200 includes a plurality of exchanger units 210. The exchanger units 210 can be compactly arranged in any suitable configuration. For this embodiment, the heat exchanger 200 includes twenty (20) exchanger units 210, including ten right-side exchanger units 211-220 stacked on top of one another along the vertical direction V and ten left-side exchanger units 221-230 stacked on top of one another along the vertical direction V. Although the heat exchanger 200 of FIG. 2 has twenty exchanger units 210, in other example embodiments, the heat exchanger 200 can include any suitable number of exchanger units, such as one exchanger unit, eight exchanger units, fifty exchanger units, etc. Further, in other embodiments, the exchanger units 210 can be positioned side-by-side rather than stacked on one another.

Figure 4:
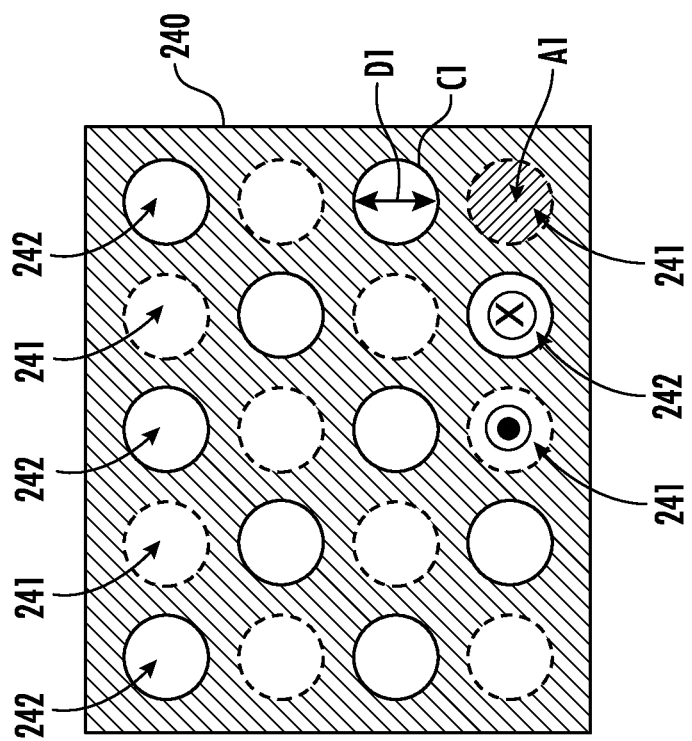
FIG. 4 provides a cross-sectional view of a core of the exchanger unit taken along line 4-4 of FIG. 3.
Figure 3:
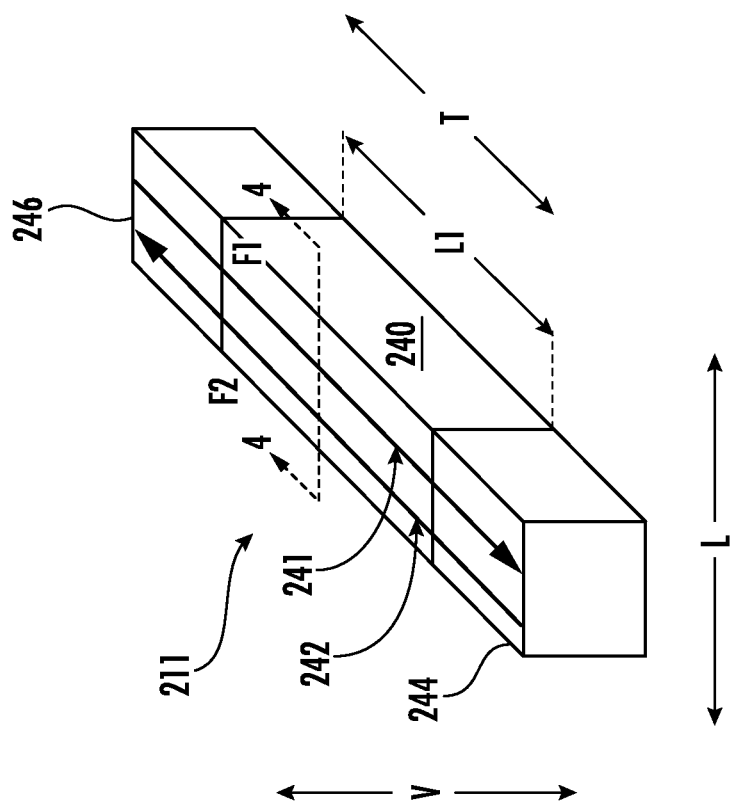
FIG. 3 provides a perspective view of an exchanger unit of the heat exchanger of FIG. 2.

With reference now to FIGS. 2, 3, and 4, FIG. 3 provides a perspective view of a first exchanger unit 211 of the heat exchanger 200 of FIG. 2. FIG. 4 provides a cross-sectional view of a core of the first exchanger unit 211 taken along line 4-4 of FIG. 3. Generally, each exchanger unit 210 of the heat exchanger 200 has a core and two manifolds. The core of each exchanger unit 210 defines first channels and second channels. The first channels can receive a first fluid and the second channels can receive a second fluid. The core of one or more of the exchanger units 210 can be formed by a plurality of unit cells arranged in flow communication with one another. Alternatively, the core of one or more of the exchanger units 210 can be formed as a monolithic block.

By way of example, as depicted, the first exchanger unit 211 includes a core 240 defining first channels 241 (outlined by dashed lines in FIG. 4) and second channels 242 (outlined by solid lines in FIG. 4). The first channels 241 can receive a first fluid F1 and the second channels 242 can receive a second fluid F2. The first fluid F1 and the second fluid F2 can both be air, for example. In this regard, the heat exchanger 200 can be an air-to-air heat exchanger. The first fluid F1 flowing through the first channels 241 can be both warmer and at a higher pressure than the second fluid F2 flowing through the second channels 242, or vice versa. In this way, thermal energy can be exchanged between the first and second fluids F1, F2 as they flow through the first exchanger unit 211. For this embodiment, the first fluid F1 flowing through the first channels 241 (out of the page as represented by the "circled dot" in FIG. 4) is in counterflow direction with respect to the second fluid F2 flowing through the second channels 242 (into the page as represented by the "circled X" in FIG. 4).

Although the core 240 of the first exchanger unit 211 is shown in a straight channel configuration in FIG. 3, the core 240 of the first exchanger unit 211 (as well as the cores of the other exchanger units 210) can have other suitable configurations, such as a double U-bend channel configuration, a single U-bend configuration, etc.

The first exchanger unit 211 includes a first manifold 244 and a second manifold 246. Generally, the first manifold 244 distributes the second fluid F2 to the second channels 242 and receives the first fluid F1 from the first channels 241. The first manifold 244 can be arranged to keep the first fluid F1 and the second fluid F2 fluidly separate. Similarly, the second manifold 246 distributes the first fluid F1 to the first channels 241 and receives the second fluid F2 from the second channels 242. The second manifold 246 can be arranged to keep the first fluid F1 and the second fluid F2 fluidly separate. The first manifold 244 and/or second manifold 246 can be in flow communication with a manifold of an adjacent exchanger unit such that the first and/or second fluids F1, F2 can flow between exchanger units 210 of the heat exchanger 200.

Each exchanger unit 210 of the heat exchanger 200 can be configured in a same or similar manner as the first exchanger unit 211 provided above. In this way, each exchanger unit 210 of the heat exchanger 200 can have a core arranged in a same or similar manner as the core 240 of the first exchanger unit 211 and two manifolds arranged in a same or similar manner as the first and second manifolds 244, 246 of the first exchanger unit 211. The core of each exchanger unit 210 defines first channels and second channels just as the core 240 defines the defines the first channels 241 and the second channels 242.

Figure 5:
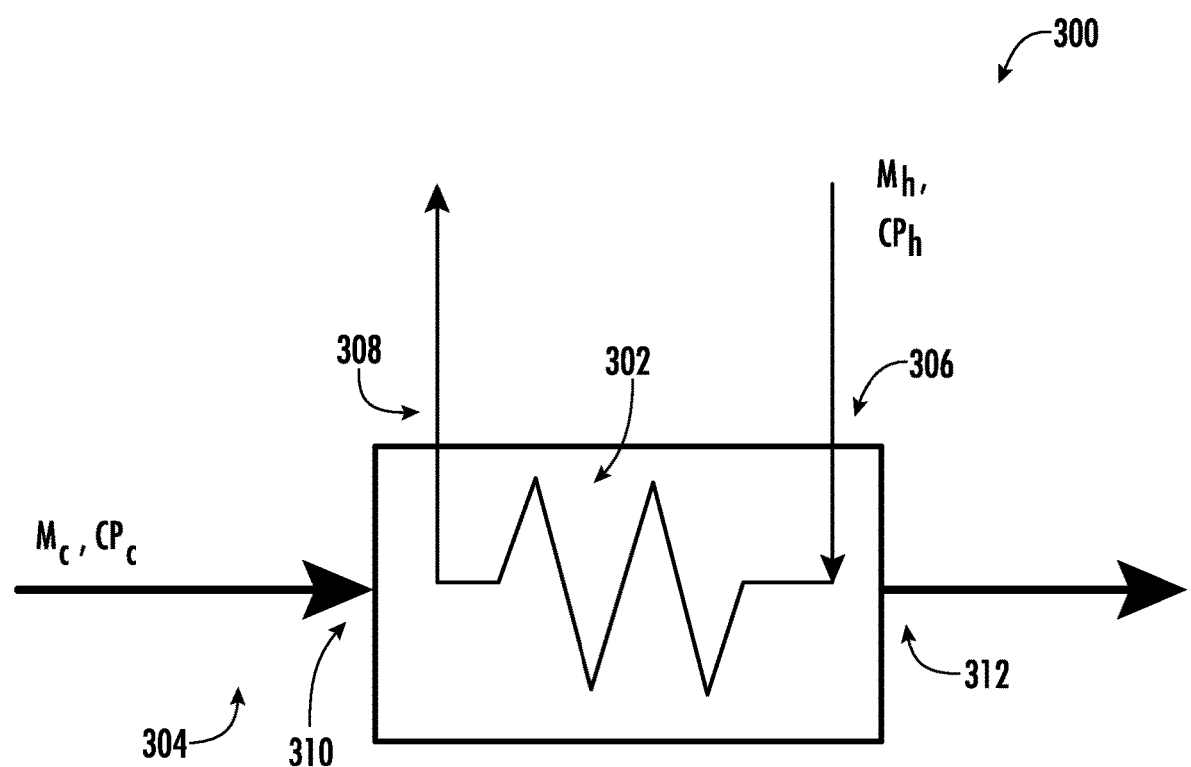
FIG. 5 provides a schematic view of a heat exchanger tied to an accessory gearbox of a turbofan engine.

Referring now to FIG. 5, a schematic view is provided of a heat exchanger 300 in accordance with an exemplary aspect of the present disclosure. The heat exchanger 300 may be configured in a similar manner as one or more of the exemplary heat exchangers 192 described above with reference to FIGS. 1 through 4.

The exemplary heat exchanger 300 of FIG. 5 includes a first fluid path defining a first fluid inlet and a first fluid outlet and a second fluid path defining a second fluid inlet and a second fluid outlet. The first fluid path is a "hot" fluid path 302 and the second fluid path is a "cold" fluid path 304. In such a manner, the first fluid inlet may be a hot fluid inlet 306, the first fluid outlet may be a hot fluid outlet 308, the second fluid inlet may be a cold fluid inlet 310, and the second fluid outlet may be a cold fluid outlet 312. The hot fluid path 302, as used herein, refers to a fluid path for a fluid providing a heat transfer to a fluid provided through the cold fluid path 304, and the cold fluid path 304, as used herein, refers to a fluid path for the fluid receiving the heat transfer from the fluid through the hot fluid path 302.

During operation of the heat exchanger 300, and in particular during operation of the heat exchanger 300 when the gas turbine engine 100 incorporating the heat exchanger 300 is operating the high pressure spool at 100% capacity, the heat exchanger 300 defines: a temperature difference $\theta$ between the fluid provided through the hot fluid inlet 306 and the fluid provided through the cold fluid inlet 310 in degrees Celsius (C); a temperature difference $\beta$ between the fluid provided through the cold fluid outlet 312 and the fluid provided through the cold fluid inlet 310 in degrees C.; a mass flowrate $m_c$ of the fluid provided through the cold fluid inlet 310 in kilograms per second (kg/s) in the heat exchanger 300; a mass flowrate $m_h$ of the fluid provided through the hot fluid inlet 306 in kg/s in the heat exchanger 300; a specific heat capacity $cp_c$ of the fluid provided through the cold fluid inlet 310 in Joules per kilogram Kelvin (J/kg-K) in the heat exchanger 300; and a specific heat capacity $cp_h$ of the fluid provided through the hot fluid inlet 306 in J/kg-K in the heat exchanger 300. These parameters may be used to characterize an effectiveness of the heat exchanger 300, as will be described elsewhere herein.

As alluded to earlier, the inventors discovered, unexpectedly during the course of engine design, that a relationship exists between the effectiveness of a heat exchanger and the ease of airflow supply to the heat exchanger. This relationship is represented by an air-to-air heat exchanger potential. The inventors have found that an air-to-air heat exchanger having an air-to-air heat exchanger potential within one of the ranges specified herein provides a heat exchanger that is both compact and effective at processing heat duty.

The air-to-air heat exchanger potential is a dimensionless quantity that relates a heat exchanger's effectiveness and an airflow conductance factor of the gas turbine engine. The effectiveness provides a measure of effectively of the heat exchanger may transfer heat between a first fluid (e.g., a cold fluid) and a second fluid (e.g., a hot fluid), and is a function of the temperature, mass flowrate, and heat capacity of the first and second fluid flows through the heat exchanger. The airflow conductance factor provides a measure of the ease of airflow through the engine core into the heat exchanger and is a function of a fan diameter of a fan of the gas turbine engine, an engine length of the gas turbine engine, a bypass ratio of the gas turbine engine, and an overall pressure ratio of the gas turbine engine. In this way, the airflow conductance factor is based on the architecture of the gas turbine engine.

As engine designers continue to increase bypass ratios of engines, ease of airflow supply to a heat exchanger in flow communication with the engine core exponentially decreases, as does the air-to-air heat exchanger potential value. This indicates that heat exchangers with high effectiveness values may be useful in processing the heat duty in high bypass turbofan engines. Generally, the combination of higher effectiveness and airflow conductance factor leads to higher potential for the heat exchanger to process more heat duty. A heat exchanger in flow communication with a gas turbine engine having an air-to-air heat exchanger potential within a range specified herein may facilitate achieving the heat duty in high bypass turbofan engines whilst taking into account certain considerations.

Particularly, the ranges of air-to-air heat exchanger potentials for air-to-air heat exchangers noted herein capture specific subsets of structures for air-to-air heat exchangers and gas turbines that take into consideration various benefits and penalties of choosing one structural architecture of a heat exchanger and/or gas turbine engine over another. In this regard, as discovered by the inventors, the ranges of air-to-air heat exchanger potentials for air-to-air heat exchangers provided herein strike a balance between the ease of supplying air flow to a heat exchanger, the compactness and weight of the heat exchanger, the ability of the heat exchanger to process heat duty, the susceptibility of the channels of the heat exchanger to becoming blocked or contaminated, the manufacturability of the heat exchanger, the manufacturability of the gas turbine engine, the thrust output of the gas turbine engine, and the bleed flow penalty on the gas turbine engine. Accordingly, a heat exchanger having an air-to-air heat exchanger potential within a range specified herein can ensure that the architecture of the heat exchanger and the architecture of the gas turbine engine are such that the heat exchanger is desirably compact and effective at processing heat duty.

Further, utilizing the air-to-air heat exchanger potential value, the inventors found that the number of suitable or feasible engine and/or heat exchanger designs that allow the heat exchanger to meet compactness, weight, and heat duty requirements could be greatly diminished, thereby facilitating a more rapid down selection of designs to consider as a gas turbine engine having an air-to-air heat exchanger is developed. Such a benefit provides more insight into the requirements for a given gas turbine engine well before specific technologies, integration and system requirements are developed fully. It may also prevent late-stage redesign. For instance, selection of a heat exchanger's effectiveness may be facilitated by utilizing the air-to-air heat exchanger potential value, which may help determine the needed channel diameters and wall thickness of the core of the heat exchanger, position of the heat exchanger within the gas turbine engine, and flow requirements for the hot and cold fluid flows. Moreover, utilizing the air-to-air heat exchanger potential may eliminate or otherwise reduce implementation of heat exchangers having effectiveness values that are too low, making them not practical to achieve the needed heat duty requirements for a gas turbine engine. Lower effectiveness values may indicate the heat exchanger needs to be resized to increase throughput for the given engine characteristics.

With reference now to FIGS. 1, 2, 3, 4, 5, and 6, FIG. 6 lists various relationships between heat exchanger characteristics and operational and architectural characteristics of a gas turbine engine. Notably, the gas turbine engine 100 and the heat exchanger 200 in flow communication with the gas turbine engine 100 are arranged so that the heat exchanger 200 has an air-to-air heat exchanger potential AHEP. The air-to-air heat exchanger potential AHEP is a dimensionless quantity that relates an effectiveness $\varepsilon_{HX}$ of the heat exchanger 200 and an airflow conductance factor ACF of the gas turbine engine 100. As will be explained more fully below, the effectiveness $\varepsilon_{HX}$ is a function of anticipated characteristics of the respective flows through the heat exchanger 200 (a hot fluid flow and a cold fluid flow) and the airflow conductance factor ACF is a function of the structural architecture of the gas turbine engine 100.

The air-to-air heat exchanger potential AHEP is defined as a product raised to a half power, wherein the product is the effectiveness $\varepsilon_{HX}$ associated with the air-to-air heat exchanger 200 multiplied by the airflow conductance factor ACF associated with the gas turbine engine 100. In this regard, the air-to-air heat exchanger potential AHEP relates the effectiveness $\varepsilon_{HX}$ of the heat exchanger 200 and the airflow conductance factor ACF of the gas turbine engine 100. The air-to-air heat exchanger potential AHEP is defined by the inventors as follows:

$$AHEP = (\varepsilon_{HX} * ACF)^{1/2} \quad (1)$$

The effectiveness $\varepsilon_{HX}$ provides a measure of how well the heat exchanger 200 exchanges heat between at least two flows. The effectiveness $\varepsilon_{HX}$ is a dimensionless quantity (i.e., no unit of measure).

The effectiveness $\varepsilon_{HX}$ of the heat exchanger 200 is a function of a temperature difference $\theta$ between a fluid provided through a hot fluid inlet and a fluid provided through a cold fluid inlet in degrees Celsius (C); a temperature difference $\beta$ between the fluid provided through a cold fluid outlet and the fluid provided through a cold fluid inlet in degrees C.; a mass flowrate $m_c$ of the fluid provided through the cold fluid inlet in kilograms per second (kg/s) in the heat exchanger 200; a mass flowrate $m_h$ of the fluid provided through the hot fluid inlet in kg/s in the heat exchanger 200; a specific heat capacity $cp_c$ of the fluid provided through the cold fluid inlet in Joules per kilogram Kelvin (J/kg-K) in the heat exchanger 200; and a specific heat capacity $cp_h$ of the fluid provided through the hot fluid inlet in J/kg-K in the heat exchanger 200. In particular, the effectiveness $\varepsilon_{HX}$ of the heat exchanger 200 is equal to a product of the mass flowrate $m_c$ of the fluid provided through the cold fluid inlet in kg/s, the specific heat capacity $cp_c$ of the fluid provided through the cold fluid inlet in J/kg-K, and the temperature difference $\beta$ between the fluid provided through the cold fluid outlet and the fluid provided through the cold fluid inlet in degrees C., divided by a product of the temperature difference $\theta$ between the fluid provided through the hot fluid inlet and the fluid provided through the cold fluid inlet in degrees C. and the minimum of the product of the mass flowrate $m_h$ of the fluid provided through the hot fluid inlet in kg/s and the specific heat capacity $cp_h$ of the fluid provided through the hot fluid inlet in J/kg-K, or the product of the mass flowrate $m_c$ of the fluid provided through the cold fluid inlet in kg/s and the specific heat capacity $cp_c$ of the fluid provided through the cold fluid inlet in J/kg-K. Notably, each of these parameters refer to values when the gas turbine engine 100 incorporating the heat exchanger 200 is operating the high pressure spool at 100% capacity, or at a maximum rotational speed. In such a manner, the effectiveness $\varepsilon_{HX}$ of a given heat exchanger is defined by the inventor as follows:

$$\varepsilon_{HX} = \frac{m_c cp_c \beta}{\min(m_h cp_h, m_c cp_c) \theta} \quad (2)$$

The airflow conductance factor ACF associated with the gas turbine engine 100 provides a measure of the ease of airflow across a gas turbine engine 100. The airflow conductance factor ACF is defined as a quotient determined by dividing a fan diameter $D_{FAN}$ by a product, the product being defined by an engine length L of the gas turbine engine 100 multiplied by a bypass ratio BPR of the gas turbine engine 100 multiplied by an overall pressure ratio OPR of the gas turbine engine 100. Stated another way, the fan diameter $D_{FAN}$ divided by a product of the engine length L of the engine, the bypass ratio BPR, and the overall pressure ratio OPR is equal to the airflow conductance factor ACF. The airflow conductance factor ACF is a dimensionless quantity. The airflow conductance factor ACF is defined by the inventors as follows:

$$ACF = D_{FAN}/(L * BPR * OPR) \quad (3)$$

The fan diameter $D_{FAN}$ is defined as a distance spanning between a leading edge tip of one fan blade 136 to a leading edge tip of a radially opposite fan blade 136. Stated another way, the fan diameter $D_{FAN}$ is defined as a fan radius $R_{FAN}$ multiplied by two, or stated mathematically, as $D_{FAN} = R_{FAN} * 2$, wherein the fan radius $R_{FAN}$ spans from the longitudinal centerline 102 to a leading edge tip of one of the fan blades 136. The unit of measure for the fan diameter $D_{FAN}$ is meters (m). In some example embodiments, the fan diameter $D_{FAN}$ of the fan 134 of the gas turbine engine 100 is between 0.5 m and 5 m. In other example embodiments, the fan diameter $D_{FAN}$ of the fan 134 of the gas turbine engine 100 is between 1.8 m and 5 m. In instances in which the fan section 104 includes a plurality of fan stages, the fan diameter $D_{FAN}$ is to be determined based on the fan having the largest fan diameter.

The engine length L, as used herein, refers to a length along an axial direction A of the gas turbine engine 100 between a forward-most tip of a rotatable spinner 144 and an aft flange 143 of the gas turbine engine 100. The aft flange 143 refers to a circumferential flange proximate an aft end of the gas turbine engine 100 used to couple a tail cone 141 to a remainder of the gas turbine engine 100. The unit of measure for the engine length L is meters (m). In certain example embodiments, the engine length L is between 1 m and 12 m, such as between 1.2 m and 10 m.

The bypass ratio BPR of the gas turbine engine 100 is defined by a ratio of a mass flow rate of the first portion of air 158 flowing through the bypass passage 152 to a mass flow rate of the second portion of air 160 entering the engine core 106 through the core inlet 110. In some example embodiments, the bypass ratio BPR of the gas turbine engine 100 may be between three and twenty (3-20). In other example embodiments, the bypass ratio BPR of the gas turbine engine 100 may be between three and ten (3-10). In further example embodiments, the bypass ratio BPR of the gas turbine engine 100 may be between ten and twenty (10-20).

The overall pressure ratio OPR refers to a ratio of a pressure of an airflow at an exit of a compressor section of the turbomachine 106 of the gas turbine engine 100 (e.g., at a location immediately downstream of a downstream-most stage of compressor rotor blades of the HP compressor 116) to a pressure of an airflow provided to the turbomachine 106 of the gas turbine engine 100 (e.g., at the inlet 110 in the embodiment of FIG. 1), each while operating the high pressure spool at 100% capacity. In certain example embodiments, the overall pressure ratio OPR is between 10 and 80.

Figure 7:
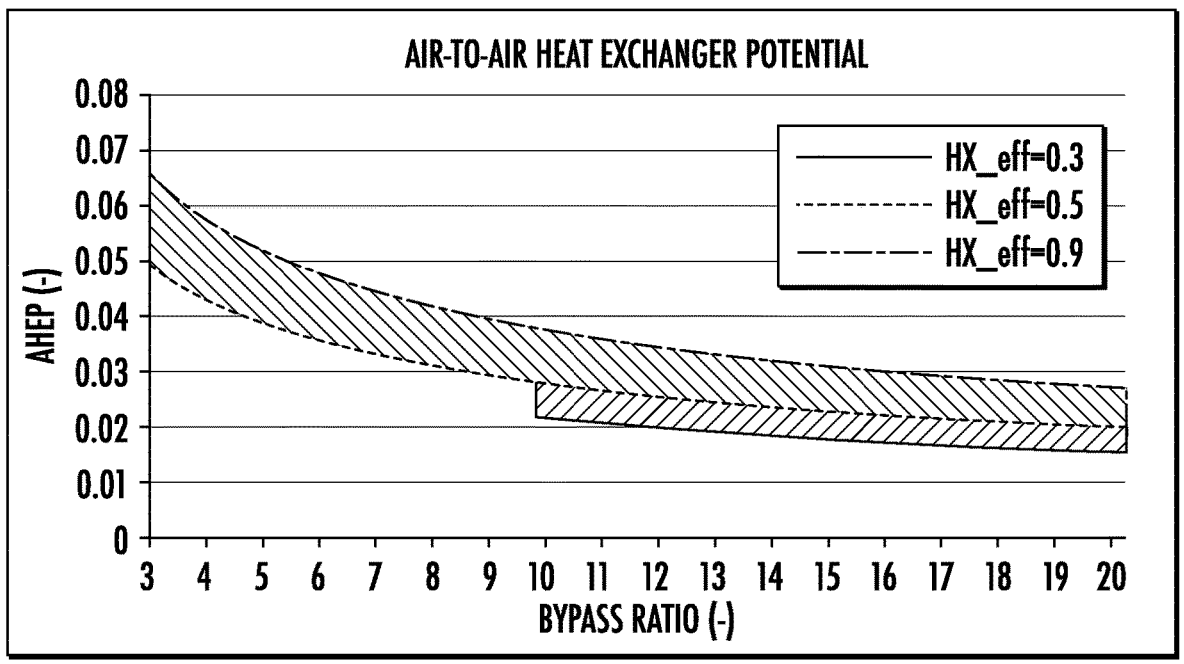
FIGS. 7 through 12 each graphically depict an air-to-air heat exchanger potential of an air-to-air heat exchanger coupled in flow communication with a gas turbine engine as a function of a bypass ratio of the gas turbine engine in accordance with example embodiments of the present disclosure.

In some embodiments, the air-to-air heat exchanger 200 has an air-to-air heat exchanger potential AHEP between 0.028 and 0.067 for a bypass ratio BPR associated with the gas turbine engine 100 between 3 and 10 and the effectiveness $\varepsilon_{HX}$ being between 0.5 and 0.9 and between 0.015 and 0.038 for a bypass ratio BPR associated with the gas turbine engine 100 between 10 and 20 and the effectiveness $\varepsilon_{HX}$ being between 0.3 and 0.9. FIG. 7 graphically depicts the air-to-air heat exchanger potential AHEP as a function of bypass ratio BPR for such example embodiments.

Figure 8:
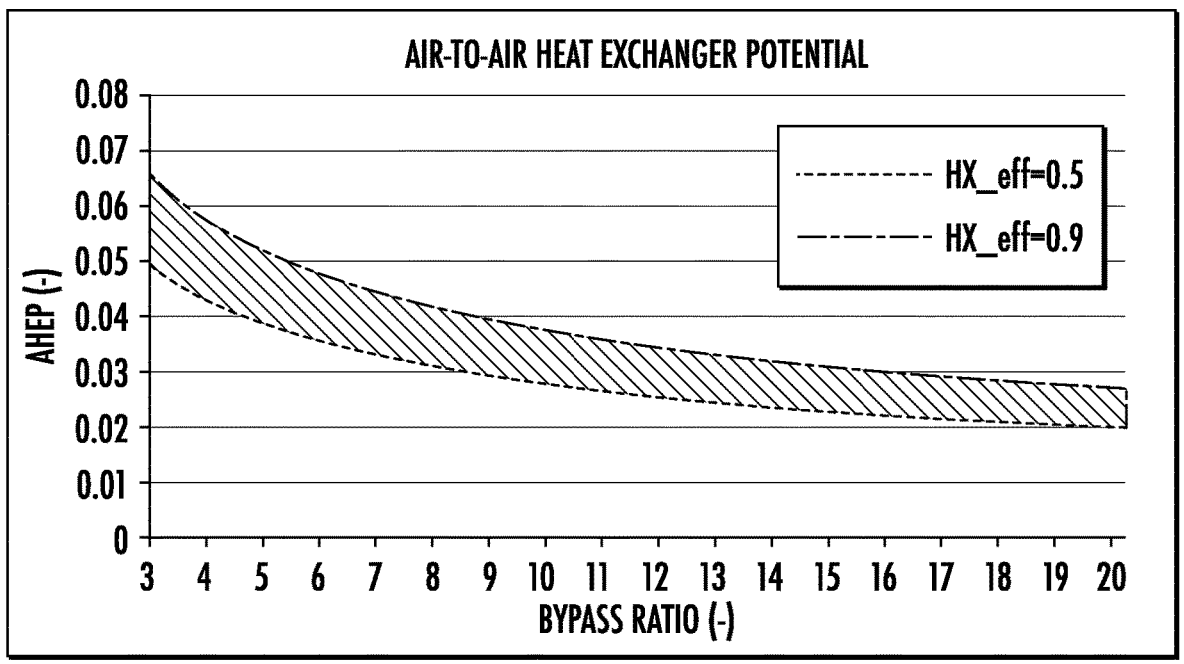

In yet other embodiments, the air-to-air heat exchanger 200 has an air-to-air heat exchanger potential AHEP between 0.020 and 0.067 for a bypass ratio BPR associated with the gas turbine engine 100 between 3 and 20 and the effectiveness $\varepsilon_{HX}$ being between 0.5 and 0.9. FIG. 8 graphically depicts the air-to-air heat exchanger potential AHEP as a function of bypass ratio BPR for such example embodiments.

Figure 9:
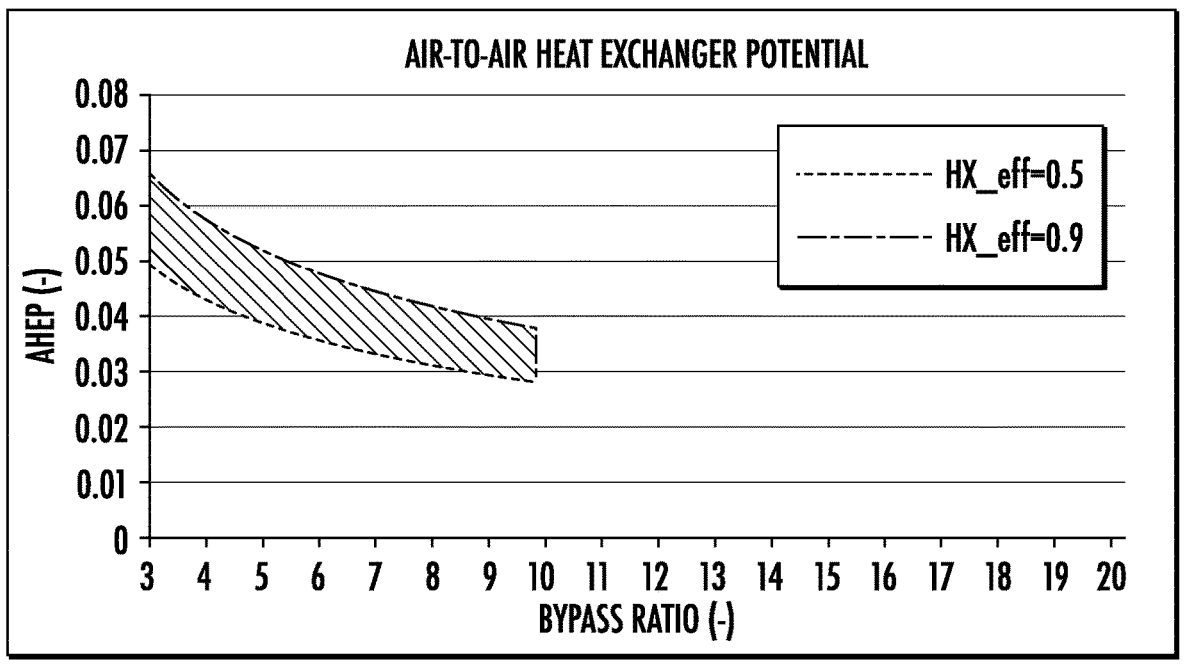

In other embodiments, the air-to-air heat exchanger 200 has an air-to-air heat exchanger potential AHEP between 0.028 and 0.067 for a bypass ratio BPR associated with the gas turbine engine 100 between 3 and 10 and the effectiveness $\varepsilon_{HX}$ being between 0.5 and 0.9. FIG. 9 graphically depicts the air-to-air heat exchanger potential AHEP as a function of bypass ratio BPR for such example embodiments.

Figure 10:
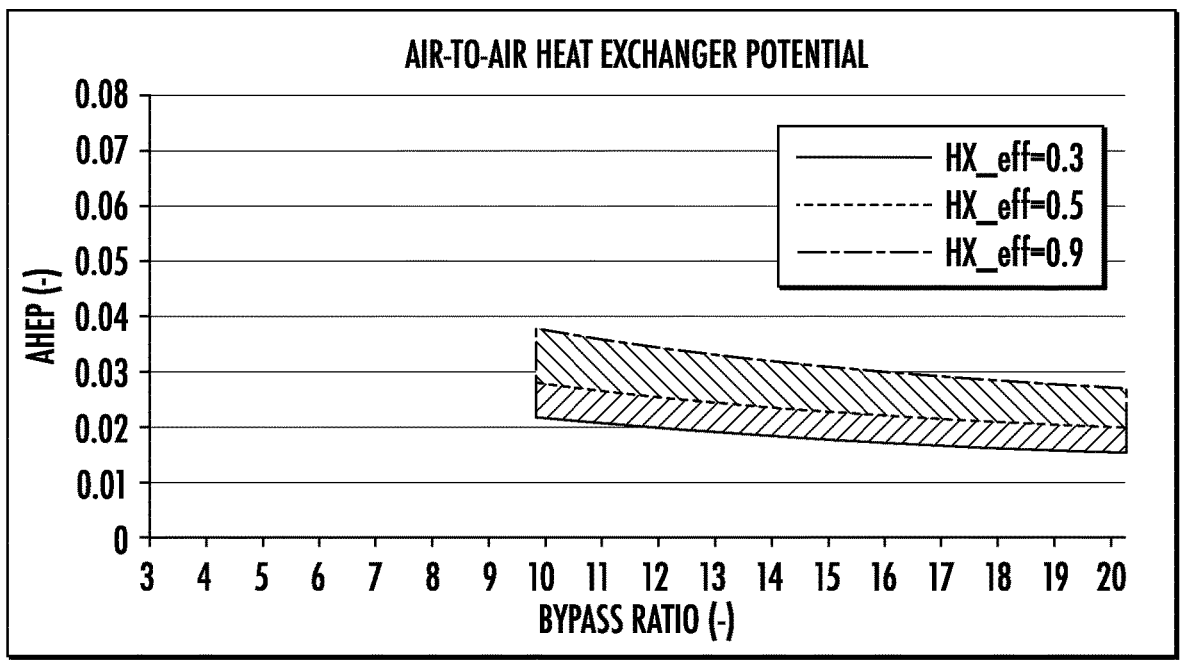

In some further embodiments, the air-to-air heat exchanger 200 has an air-to-air heat exchanger potential AHEP between 0.015 and 0.038 for a bypass ratio BPR associated with the gas turbine engine 100 between 10 and 20 and the effectiveness $\varepsilon_{HX}$ being between 0.3 and 0.9. FIG. 10 graphically depicts the air-to-air heat exchanger potential AHEP as a function of bypass ratio BPR for such example embodiments.

Figure 11:
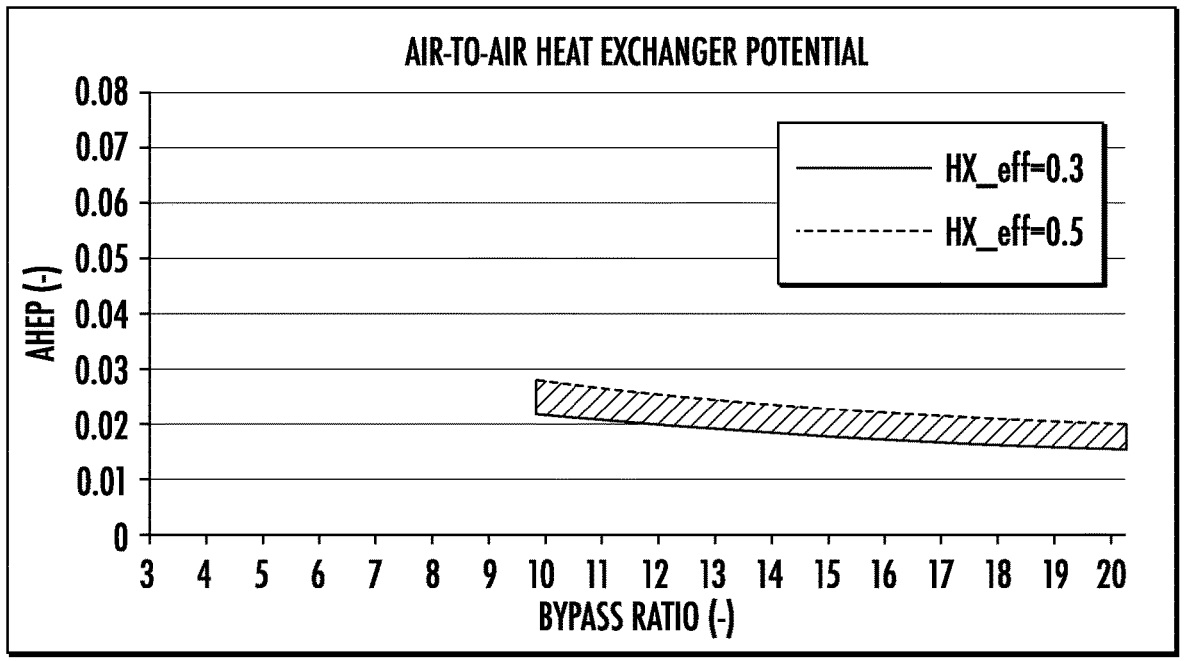

In yet other embodiments, the air-to-air heat exchanger 200 has an air-to-air heat exchanger potential AHEP between 0.015 and 0.028 for a bypass ratio BPR associated with the gas turbine engine between 10 and 20 and the effectiveness $\varepsilon_{HX}$ being between 0.3 and 0.5. FIG. 11 graphically depicts the air-to-air heat exchanger potential AHEP as a function of bypass ratio BPR for such example embodiments.

Figure 12:
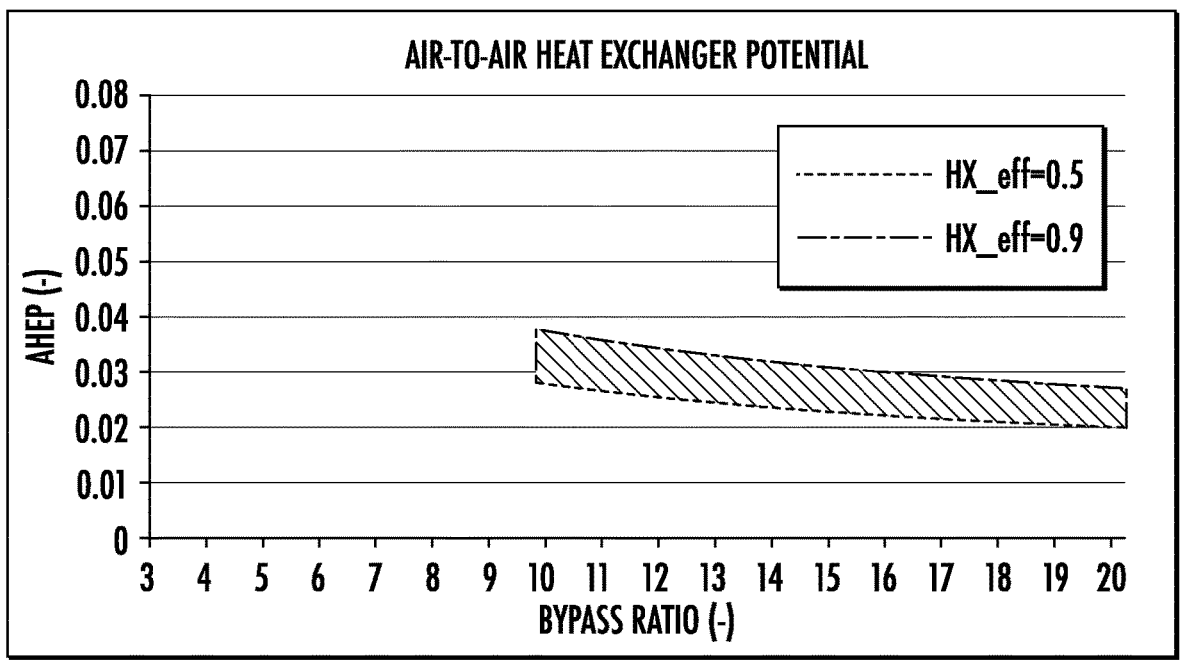

In further embodiments, the air-to-air heat exchanger 200 has an air-to-air heat exchanger potential AHEP between 0.020 and 0.038 for a bypass ratio BPR associated with the gas turbine engine between 10 and 20 and the effectiveness $\varepsilon_{HX}$ being between 0.5 and 0.9. FIG. 12 graphically depicts the air-to-air heat exchanger potential AHEP as a function of bypass ratio BPR for such example embodiments.

With reference now to FIG. 13, various examples of gas turbine engines each having an air-to-air heat exchanger in flow communication therewith are provided below.

EXAMPLE 1: In a first example, a gas turbine engine includes an air-to-air heat exchanger. The air-to-air heat exchanger is arranged such that the effectiveness $\varepsilon_{HX}$ is 0.3. The gas turbine engine has a fan having a fan diameter $D_{FAN}$ of 0.5 m. The gas turbine engine defines a bypass ratio BPR of 3.0, an engine length of 1.2 m, and an overall pressure ratio of 10. For the first example, the air-to-air heat exchanger potential AHEP is 0.065.

EXAMPLE 2: In a second example, a gas turbine engine includes an air-to-air heat exchanger. The air-to-air heat exchanger is arranged such that the effectiveness $\varepsilon_{HX}$ is 0.7. The gas turbine engine has a fan having a fan diameter $D_{FAN}$ of 3 m. The gas turbine engine defines a bypass ratio BPR of 10, an engine length of 4 m, and an overall pressure ratio of 50. For the second example, the air-to-air heat exchanger potential AHEP is 0.032.

EXAMPLE 3: In a third example, a gas turbine engine includes an air-to-air heat exchanger. The air-to-air heat exchanger is arranged such that the effectiveness $\varepsilon_{HX}$ is 0.9. The gas turbine engine has a fan having a fan diameter $D_{FAN}$ of 5 m. The gas turbine engine defines a bypass ratio BPR of 20, an engine length of 10 m, and an overall pressure ratio of 80. For the third example, the air-to-air heat exchanger potential AHEP is 0.017.

FIG. 14 provides a flow diagram for a method 400 of operating a gas turbine engine having a heat exchanger in flow communication thereto.

At 402, the method includes operating a gas turbine engine having a fan and an engine core positioned downstream of the fan, the engine core having a compressor section that includes one or more compressors, the engine core defining a core air flowpath, the gas turbine engine having an air-to-air heat exchanger in flow communication with the core air flowpath and having an air-to-air heat exchanger potential defined by a product raised to a half power, the product being a effectiveness associated with the air-to-air heat exchanger multiplied by an airflow conductance factor that relates a fan diameter of the fan, a bypass ratio of the gas turbine engine, and a number of compressor stages of the gas turbine engine, and wherein the gas turbine engine is operated so that the air-to-air heat exchanger potential is between 0.028 and 0.067 for a bypass ratio associated with the gas turbine engine between 3 and 10 and the effectiveness being between 0.5 and 0.9 and is between 0.015 and 0.038 for a bypass ratio associated with the gas turbine engine between 10 and 20 and the effectiveness being between 0.3 and 0.9.

In some implementations, the air-to-air heat exchanger includes one or more exchanger units each having a core defining a plurality of channels. For instance, the air-to-air heat exchanger can include twenty exchanger units as depicted in FIG. 2.

In some implementations, the airflow conductance factor associated with the gas turbine engine is defined as a quotient determined by dividing a fan diameter of a fan of the gas turbine engine by a product, the product being defined by an engine length of the gas turbine engine multiplied by a bypass ratio of the gas turbine engine multiplied by an overall pressure ratio of the gas turbine engine. In this way, the airflow conductance factor is a function of a fan diameter of a fan of the gas turbine engine, an engine length, a bypass ratio of the gas turbine engine, and an overall pressure ratio. In some further implementations, the diameter of the fan of the gas turbine engine is between 0.5 m and 5 m. In other implementations, the diameter of the fan of the gas turbine engine is between 1.8 m and 5 m. In some other implementations, the overall pressure ratio may be between 10 and 80.

In some implementations, the gas turbine engine is operated so that the air-to-air heat exchanger potential is between 0.020 and 0.067 for a bypass ratio associated with the gas turbine engine between 3 and 20 and the effectiveness being between 0.5 and 0.9. The air-to-air heat exchanger potential according to such implementations is graphically represented in FIG. 8.

In some implementations, the gas turbine engine is operated so that the air-to-air heat exchanger potential is between 0.028 and 0.067 for a bypass ratio associated with the gas turbine engine between 3 and 10 and the effectiveness being between 0.5 and 0.9. The air-to-air heat exchanger potential according to such implementations is graphically represented in FIG. 9.

In some implementations, the gas turbine engine is operated so that the air-to-air heat exchanger potential is between 0.015 and 0.038 for a bypass ratio associated with the gas turbine engine between 10 and 20 and the effectiveness being between 0.3 and 0.9. The air-to-air heat exchanger potential according to such implementations is graphically represented in FIG. 10.

In some implementations, the gas turbine engine is operated so that the air-to-air heat exchanger potential is between 0.015 and 0.028 for a bypass ratio associated with the gas turbine engine between 10 and 20 and the effectiveness being between 0.3 and 0.5. The air-to-air heat exchanger potential according to such implementations is graphically represented in FIG. 11.

In some implementations, the gas turbine engine is operated so that the air-to-air heat exchanger potential is between 0.020 and 0.038 for a bypass ratio associated with the gas turbine engine between 10 and 20 and the effectiveness being between 0.5 and 0.9. The air-to-air heat exchanger potential according to such implementations is graphically represented in FIG. 12.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine, comprising: a compressor section, a combustion section, and a turbine section in a serial flow arrangement; and an air-to-air heat exchanger having an air-to-air heat exchanger potential defined by a product raised to a half power, the product being an effectiveness associated with the air-to-air heat exchanger multiplied by an airflow conductance factor associated with the gas turbine engine, and wherein the air-to-air heat exchanger potential is between 0.028 and 0.067 for a bypass ratio associated with the gas turbine engine between 3 and 10 and the effectiveness being between 0.5 and 0.9 and is between 0.015 and 0.038 for a bypass ratio associated with the gas turbine engine between 10 and 20 and the effectiveness being between 0.3 and 0.9.

The gas turbine engine of the preceding clause, wherein the air-to-air heat exchanger further comprises one or more exchanger units each having a core defining a plurality of channels.

The gas turbine engine of one or more of the preceding clauses, wherein the air-to-air heat exchanger defines a cold fluid inlet, a cold fluid outlet, a hot fluid inlet, and a hot fluid outlet, and wherein the effectiveness is equal to a first product divided by a second product, where the first product is a product of a mass flowrate $m_c$ of a fluid provided through the cold fluid inlet in kilograms per second (kg/s), a specific heat capacity of the fluid provided through the cold fluid inlet in Joules per kilogram Kelvin (J/kg-K), and a temperature difference $\beta$ between the fluid provided through the cold fluid outlet and the fluid provided through the cold fluid inlet in degrees C., and wherein the second product is a product of a temperature difference $\theta$ between a fluid provided through the hot fluid inlet and the fluid provided through the cold fluid inlet in degrees C. and the minimum of a product of a mass flowrate $m_h$ of the fluid provided through the hot fluid inlet in kg/s and a specific heat capacity $cp_h$ of the fluid provided through the hot fluid inlet in J/kg-K, or the product of a mass flowrate $m_c$ of the fluid provided through the cold fluid inlet in kg/s and a specific heat capacity $cp_c$ of the fluid provided through the cold fluid inlet in J/kg-K.

The gas turbine engine of one or more of the preceding clauses, further comprising: a fan, and wherein the airflow conductance factor associated with the gas turbine engine is defined as a quotient determined by dividing a fan diameter of the fan of the gas turbine engine by a product, the product being defined by an engine length of the gas turbine engine multiplied by a bypass ratio of the gas turbine engine multiplied by an overall pressure ratio of the gas turbine engine.

The gas turbine engine of one or more of the preceding clauses, wherein the fan diameter is between 0.5 m and 5 m.

The gas turbine engine of one or more of the preceding clauses, wherein the fan diameter is between 1.8 m and 3.5 m.

The gas turbine engine of one or more of the preceding clauses, wherein the overall pressure ratio is between 10 and 80.

The gas turbine engine of one or more of the preceding clauses, wherein the overall pressure ratio is defined while the gas turbine engine is operating a high pressure spool of the gas turbine engine at 100% capacity.

The gas turbine engine of one or more of the preceding clauses, wherein the air-to-air heat exchanger potential is between 0.020 and 0.067 for a bypass ratio associated with the gas turbine engine between 3 and 20 and the effectiveness being between 0.5 and 0.9.

The gas turbine engine of one or more of the preceding clauses, wherein the air-to-air heat exchanger potential is between 0.028 and 0.067 for a bypass ratio associated with the gas turbine engine between 3 and 10 and the effectiveness being between 0.5 and 0.9.

The gas turbine engine of one or more of the preceding clauses, wherein the air-to-air heat exchanger potential is between 0.015 and 0.038 for a bypass ratio associated with the gas turbine engine between 10 and 20 and the effectiveness being between 0.3 and 0.9.

The gas turbine engine of one or more of the preceding clauses, wherein the air-to-air heat exchanger potential is between 0.015 and 0.028 for a bypass ratio associated with the gas turbine engine between 10 and 20 and the effectiveness being between 0.3 and 0.5.

The gas turbine engine of one or more of the preceding clauses, wherein the air-to-air heat exchanger potential is between 0.020 and 0.038 for a bypass ratio associated with the gas turbine engine between 10 and 20 and the effectiveness being between 0.5 and 0.9.

The gas turbine engine of one or more of the preceding clauses, wherein the overall pressure ratio is defined while the gas turbine engine is operating a high pressure spool of the gas turbine engine at 100% capacity.

An air-to-air heat exchanger in flow communication with a core air flowpath of a gas turbine engine, the air-to-air heat exchanger having an air-to-air heat exchanger potential defined by a product raised to a half power, the product being an effectiveness associated with the air-to-air heat exchanger multiplied by an airflow conductance factor that relates a fan diameter of a fan of the gas turbine engine, an engine length of the gas turbine engine, a bypass ratio of the gas turbine engine, and an overall pressure ratio of the gas turbine engine, the compressor section having one or more compressors and the fan section having a fan, and wherein the air-to-air heat exchanger potential is between 0.028 and 0.067 for a bypass ratio associated with the gas turbine engine between 3 and 10 and the effectiveness being between 0.5 and 0.9 and is between 0.015 and 0.038 for a bypass ratio associated with the gas turbine engine between 10 and 20 and the effectiveness being between 0.3 and 0.9.

The air-to-air heat exchanger of one or more of the preceding clauses, wherein the airflow conductance factor associated with the gas turbine engine is defined as a quotient determined by dividing the fan diameter of the fan by a product, the product being defined by the engine length of the gas turbine engine multiplied by the bypass ratio of the gas turbine engine multiplied by the overall pressure ratio of the gas turbine engine.

The air-to-air heat exchanger of one or more of the preceding clauses, wherein the fan diameter is between 0.5 m and 5 m.

The air-to-air heat exchanger of one or more of the preceding clauses, wherein the overall pressure ratio is between 10 and 80.

The air-to-air heat exchanger of one or more of the preceding clauses, wherein the overall pressure ratio is defined while the gas turbine engine is operating a high pressure spool of the gas turbine engine at 100% capacity.

A method, comprising: operating a gas turbine engine having a fan and an engine core positioned downstream of the fan, the engine core having a compressor section that includes one or more compressors, the engine core defining a core air flowpath, the gas turbine engine having an air-to-air heat exchanger in flow communication with the core air flowpath and having an air-to-air heat exchanger potential defined by a product raised to a half power, the product being a effectiveness associated with the air-to-air heat exchanger multiplied by an airflow conductance factor that relates a fan diameter of the fan, a bypass ratio of the gas turbine engine, and a number of compressor stages of the gas turbine engine, and wherein the gas turbine engine is operated so that the air-to-air heat exchanger potential is between 0.028 and 0.067 for a bypass ratio associated with the gas turbine engine between 3 and 10 and the effectiveness being between 0.5 and 0.9 and is between 0.015 and 0.038 for a bypass ratio associated with the gas turbine engine between 10 and 20 and the effectiveness being between 0.3 and 0.9.

We claim:

1. A gas turbine engine, comprising:
   a compressor section, a combustion section, and a turbine section in a serial flow arrangement; and
   an air-to-air heat exchanger having an air-to-air heat exchanger potential defined by a product raised to a half power, the product being an effectiveness associated with the air-to-air heat exchanger multiplied by an airflow conductance factor associated with the gas turbine engine, and
   wherein the air-to-air heat exchanger potential is between 0.028 and 0.067 for a bypass ratio associated with the gas turbine engine between 3 and 10 and the effectiveness being between 0.5 and 0.9 and is between 0.015 and 0.038 for a bypass ratio associated with the gas turbine engine between 10 and 20 and the effectiveness being between 0.3 and 0.9.

2. The gas turbine engine of claim 1, wherein the air-to-air heat exchanger further comprises one or more exchanger units each having a core defining a plurality of channels.

3. The gas turbine engine of claim 2, wherein the air-to-air heat exchanger defines a cold fluid inlet, a cold fluid outlet, a hot fluid inlet, and a hot fluid outlet, and wherein the effectiveness is equal to a first product divided by a second product, where the first product is a product of a mass flowrate $m_c$ of a fluid provided through the cold fluid inlet in kilograms per second (kg/s), a specific heat capacity of the fluid provided through the cold fluid inlet in Joules per kilogram Kelvin (J/kg-K), and a temperature difference $\beta$ between the fluid provided through the cold fluid outlet and the fluid provided through the cold fluid inlet in degrees C., and wherein the second product is a product of a temperature difference $\theta$ between a fluid provided through the hot fluid inlet and the fluid provided through the cold fluid inlet in degrees C. and the minimum of a product of a mass flowrate $m_h$ of the fluid provided through the hot fluid inlet in kg/s and a specific heat capacity $cp_h$ of the fluid provided through the hot fluid inlet in J/kg-K, or the product of a mass flowrate $m_c$ of the fluid provided through the cold fluid inlet in kg/s and a specific heat capacity $cp_c$ of the fluid provided through the cold fluid inlet in J/kg-K.

4. The gas turbine engine of claim 1, further comprising:
   a fan, and
   wherein the airflow conductance factor associated with the gas turbine engine is defined as a quotient determined by dividing a fan diameter of the fan of the gas turbine engine by a product, the product being defined by an engine length of the gas turbine engine multiplied by a bypass ratio of the gas turbine engine multiplied by an overall pressure ratio of the gas turbine engine.

5. The gas turbine engine of claim 4, wherein the fan diameter is between 0.5 m and 5 m.

6. The gas turbine engine of claim 4, wherein the fan diameter is between 1.8 m and 3.5 m.

7. The gas turbine engine of claim 4, wherein the overall pressure ratio is between 10 and 80.

8. The gas turbine engine of claim 4, wherein the overall pressure ratio is defined while the gas turbine engine is operating a high pressure spool of the gas turbine engine at 100% capacity.

9. The gas turbine engine of claim 4, wherein the overall pressure ratio is defined while the gas turbine engine is operating a high pressure spool of the gas turbine engine at 100% capacity.

10. The gas turbine engine of claim 1, wherein the air-to-air heat exchanger potential is between 0.020 and 0.067 for a bypass ratio associated with the gas turbine engine between 3 and 20 and the effectiveness being between 0.5 and 0.9.

11. The gas turbine engine of claim 1, wherein the air-to-air heat exchanger potential is between 0.028 and 0.067 for a bypass ratio associated with the gas turbine engine between 3 and 10 and the effectiveness being between 0.5 and 0.9.

12. The gas turbine engine of claim 1, wherein the air-to-air heat exchanger potential is between 0.015 and 0.038 for a bypass ratio associated with the gas turbine engine between 10 and 20 and the effectiveness being between 0.3 and 0.9.

13. The gas turbine engine of claim 1, wherein the air-to-air heat exchanger potential is between 0.015 and 0.028 for a bypass ratio associated with the gas turbine engine between 10 and 20 and the effectiveness being between 0.3 and 0.5.

14. The gas turbine engine of claim 1, wherein the air-to-air heat exchanger potential is between 0.020 and 0.038 for a bypass ratio associated with the gas turbine engine between 10 and 20 and the effectiveness being between 0.5 and 0.9.

15. An air-to-air heat exchanger in flow communication with a core air flowpath of a gas turbine engine, the air-to-air heat exchanger having an air-to-air heat exchanger potential defined by a product raised to a half power, the product being an effectiveness associated with the air-to-air heat exchanger multiplied by an airflow conductance factor that relates a fan diameter of a fan of the gas turbine engine, an engine length of the gas turbine engine, a bypass ratio of the gas turbine engine, and an overall pressure ratio of the gas turbine engine, the compressor section having one or more compressors and the fan section having a fan, and wherein the air-to-air heat exchanger potential is between 0.028 and 0.067 for a bypass ratio associated with the gas turbine engine between 3 and 10 and the effectiveness being between 0.5 and 0.9 and is between 0.015 and 0.038 for a bypass ratio associated with the gas turbine engine between 10 and 20 and the effectiveness being between 0.3 and 0.9.

16. The air-to-air heat exchanger of claim 15, wherein the airflow conductance factor associated with the gas turbine engine is defined as a quotient determined by dividing the fan diameter of the fan by a product, the product being defined by the engine length of the gas turbine engine multiplied by the bypass ratio of the gas turbine engine multiplied by the overall pressure ratio of the gas turbine engine.

17. The air-to-air heat exchanger of claim 15, wherein the fan diameter is between 0.5 m and 5 m.

18. The air-to-air heat exchanger of claim 15, wherein the overall pressure ratio is between 10 and 80.

19. The air-to-air heat exchanger of claim 15, wherein the overall pressure ratio is defined while the gas turbine engine is operating a high pressure spool of the gas turbine engine at 100% capacity.

20. A method, comprising:
operating a gas turbine engine having a fan and an engine core positioned downstream of the fan, the engine core having a compressor section that includes one or more compressors, the engine core defining a core air flowpath, the gas turbine engine having an air-to-air heat exchanger in flow communication with the core air flowpath and having an air-to-air heat exchanger potential defined by a product raised to a half power, the product being a effectiveness associated with the air-to-air heat exchanger multiplied by an airflow conductance factor that relates a fan diameter of the fan, a bypass ratio of the gas turbine engine, and a number of compressor stages of the gas turbine engine, and
wherein the gas turbine engine is operated so that the air-to-air heat exchanger potential is between 0.028 and 0.067 for a bypass ratio associated with the gas turbine engine between 3 and 10 and the effectiveness being between 0.5 and 0.9 and is between 0.015 and 0.038 for a bypass ratio associated with the gas turbine engine between 10 and 20 and the effectiveness being between 0.3 and 0.9.

* * * * *